「US011609949B2」

United States Patent
Chiarandini et al.

(10) Patent No.: US 11,609,949 B2
(45) Date of Patent: Mar. 21, 2023

(54) METHODS, SYSTEMS, AND MEDIA FOR MODIFYING SEARCH RESULTS BASED ON SEARCH QUERY RISK

(71) Applicant: Google LLC, Mountain View, CA (US)

(72) Inventors: Luca Chiarandini, Zurich (CH); Krystof Hoder, Adliswil (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/055,247

(22) PCT Filed: Nov. 6, 2019

(86) PCT No.: PCT/US2019/060070
§ 371 (c)(1),
(2) Date: Nov. 13, 2020

(87) PCT Pub. No.: WO2020/106451
PCT Pub. Date: May 28, 2020

(65) Prior Publication Data
US 2021/0224321 A1     Jul. 22, 2021

Related U.S. Application Data

(60) Provisional application No. 62/769,894, filed on Nov. 20, 2018.

(51) Int. Cl.
    *G06F 16/735*      (2019.01)
    *G06F 16/738*      (2019.01)

(52) U.S. Cl.
CPC ........ *G06F 16/735* (2019.01); *G06F 16/738* (2019.01)

(58) Field of Classification Search
CPC ............................ G06F 16/735; G06F 16/738
See application file for complete search history.

(56) References Cited

U.S. PATENT DOCUMENTS 6,012,053 A     1/2000    Pant et al.
7,797,635 B1 *   9/2010    Denise ................ G06F 16/9038
                                                 715/738

(Continued)

OTHER PUBLICATIONS

Sullivan, D., "Google Launches New Effort to Flag Upsetting or Offensive Content in Search", pp. 1-12, available at: https://searchengineland.com/google-flag-upsetting-offensive-content-271119, last updated Mar. 14, 2017.

*Primary Examiner* — Vaishali Shah
(74) *Attorney, Agent, or Firm* — Byrne Poh LLP

(57) ABSTRACT

Methods, systems, and media for demoting search results based on search query risk are provided. In some embodiments, a method for demoting search results includes: receiving a search query for a video content item; generating a plurality of search results in response to the search query; calculating a set of result goodness values; calculating a query goodness value associated with the search query based on the set of result goodness values; identifying a threshold goodness value based on the query goodness value; in response to determining that a first result goodness value of the set of result goodness values is less than the threshold goodness value, demoting a first search result of the plurality of search results, wherein the first result goodness value is associated with the first search result; and causing at least a portion of the plurality of search results to be presented based on the demotion.

15 Claims, 9 Drawing Sheets

(56) References Cited

U.S. PATENT DOCUMENTS

| | | | |
|---|---|---|---|
| 7,853,589 B2 | 12/2010 | Svore et al. | |
| 8,005,826 B1* | 8/2011 | Sahami | G06F 16/78 |
| | | | 707/723 |
| 9,213,745 B1* | 12/2015 | Benitez | G06F 16/48 |
| 10,708,564 B2* | 7/2020 | Park | H04N 11/20 |
| 2010/0316300 A1* | 12/2010 | Epshtein | G06V 20/635 |
| | | | 382/229 |
| 2011/0047163 A1* | 2/2011 | Chechik | G06F 16/70 |
| | | | 707/E17.071 |
| 2011/0082712 A1* | 4/2011 | Eberhardt, III | G16H 50/30 |
| | | | 705/4 |
| 2011/0087680 A1* | 4/2011 | Murdock | G06Q 30/02 |
| | | | 707/E17.058 |
| 2011/0093459 A1* | 4/2011 | Dong | G06F 16/9535 |
| | | | 707/E17.014 |
| 2011/0150328 A1* | 6/2011 | Han | G06V 20/10 |
| | | | 382/165 |
| 2011/0191310 A1* | 8/2011 | Liao | G06F 16/313 |
| | | | 707/723 |
| 2012/0150850 A1 | 6/2012 | Parthasarathy et al. | |
| 2016/0246791 A1* | 8/2016 | Long | G06F 16/24578 |
| 2016/0306801 A1* | 10/2016 | Andrianakou | G06F 16/285 |

* cited by examiner

METHODS, SYSTEMS, AND MEDIA FOR MODIFYING SEARCH RESULTS BASED ON SEARCH QUERY RISK

CROSS-REFERENCE TO RELATED APPLICATION

This application claims the benefit of U.S. Provisional Application No. 62/769,894, filed Nov. 20, 2018, which is hereby incorporated by reference herein in its entirety.

TECHNICAL FIELD

The disclosed subject matter relates to methods, systems, and media for modifying search results based on search query risk. More particularly, the disclosed subject matter relates to determining whether to demote a search result based on search query risk.

BACKGROUND

Keyword searching is an important tool that allows users to discover content on media content platforms. As such, great emphasis is placed on search engine optimization to cause content to appear earlier (or rank higher) in a search results list for certain keyword search queries. Content, such as a video content, that receives a high rank in a search results list is more visible to users, which can attract more visitors that may select the video content for consumption, accrue more watch time, and ultimately lead to increased revenue. However, bad actors can abuse this visibility by optimizing misleading (e.g., spam), racy, pornographic, infringing, and/or "clickbait" content to target search queries that are deemed as being risky. For example, the search query "action full movie 2018" may yield a search results list including abusive re-uploads of action movies.

Accordingly, it is desirable to provide new methods, systems, and media for modifying search results based on search query risk.

SUMMARY

Methods, systems, and media for modifying search results based on search query risk are provided.

In accordance with some embodiments of the disclosed subject matter, a method for demoting search results is provided, the method comprising: receiving a search query for a video content item; generating a plurality of search results in response to the search query; calculating a set of result values, wherein each result value of the set of result values is associated with a respective search result of the plurality of search results; calculating a query value associated with the search query based on the set of result values; identifying a threshold value based on the query value; determining whether each result value of the set of result values is less than the threshold value; in response to determining that a first result value of the set of result values is less than the threshold value, demoting a first search result of the plurality of search results, wherein the first result value is associated with the first search result; and causing at least a portion of the plurality of search results to be presented based on the demotion.

In some embodiments, the method further comprises: collecting feature information for each search result of the plurality of search results; calculating a plurality of feature values for each search result of the plurality of search results based on the feature information; and calculating each result value of the set of result values based on the plurality of feature values of the associated search result.

In some embodiments, calculating the query value comprises calculating an average of the set of result values.

In some embodiments, the method further comprises adjusting at least one result value of the set of result values prior to calculating the average.

In some embodiments, identifying the threshold value comprises identifying the threshold value based on a function that maps a range of query values to corresponding threshold values.

In some embodiments, the method further comprises adjusting the function based on historical search traffic.

In accordance with some embodiments of the disclosed subject matter, a system for demoting search results is provided, the system comprising a hardware processor that is configured to: receive a search query for a video content item; generate a plurality of search results in response to the search query; calculate a set of result values, wherein each result value of the set of result values is associated with a respective search result of the plurality of search results; calculate a query value associated with the search query based on the set of result values; identify a threshold value based on the query value; determine whether each result value of the set of result values is less than the threshold value; in response to determining that a first result value of the set of result values is less than the threshold value, demote a first search result of the plurality of search results, wherein the first result value is associated with the first search result; and cause at least a portion of the plurality of search results to be presented based on the demotion.

In accordance with some embodiments of the disclosed subject matter, a non-transitory computer-readable medium containing computer-executable instructions that, when executed by a processor, cause the processor to perform a method for demoting search results is provided, the method comprising: receiving a search query for a video content item; generating a plurality of search results in response to the search query; calculating a set of result values, wherein each result value of the set of result values is associated with a respective search result of the plurality of search results; calculating a query value associated with the search query based on the set of result values; identifying a threshold value based on the query value; determining whether each result value of the set of result values is less than the threshold value; in response to determining that a first result value of the set of result values is less than the threshold value, demoting a first search result of the plurality of search results, wherein the first result value is associated with the first search result; and causing at least a portion of the plurality of search results to be presented based on the demotion.

In accordance with some embodiments of the disclosed subject matter, a system for demoting search results is provided, the system comprising: means for receiving a search query for a video content item; means for generating a plurality of search results in response to the search query; means for calculating a set of result values, wherein each result value of the set of result values is associated with a respective search result of the plurality of search results; means for calculating a query value associated with the search query based on the set of result values; means for identifying a threshold value based on the query value; means for determining whether each result value of the set of result values is less than the threshold value; means for demoting a first search result of the plurality of search results in response to determining that a first result value of the set of result values is less than the threshold value, wherein the first result value is associated with the first search result; and means for causing at least a portion of the plurality of search results to be presented based on the demotion.

Optional features of one aspect may be combined with any other aspect. For example, optional features of the method aspect described above may be combined with any of the system aspects.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
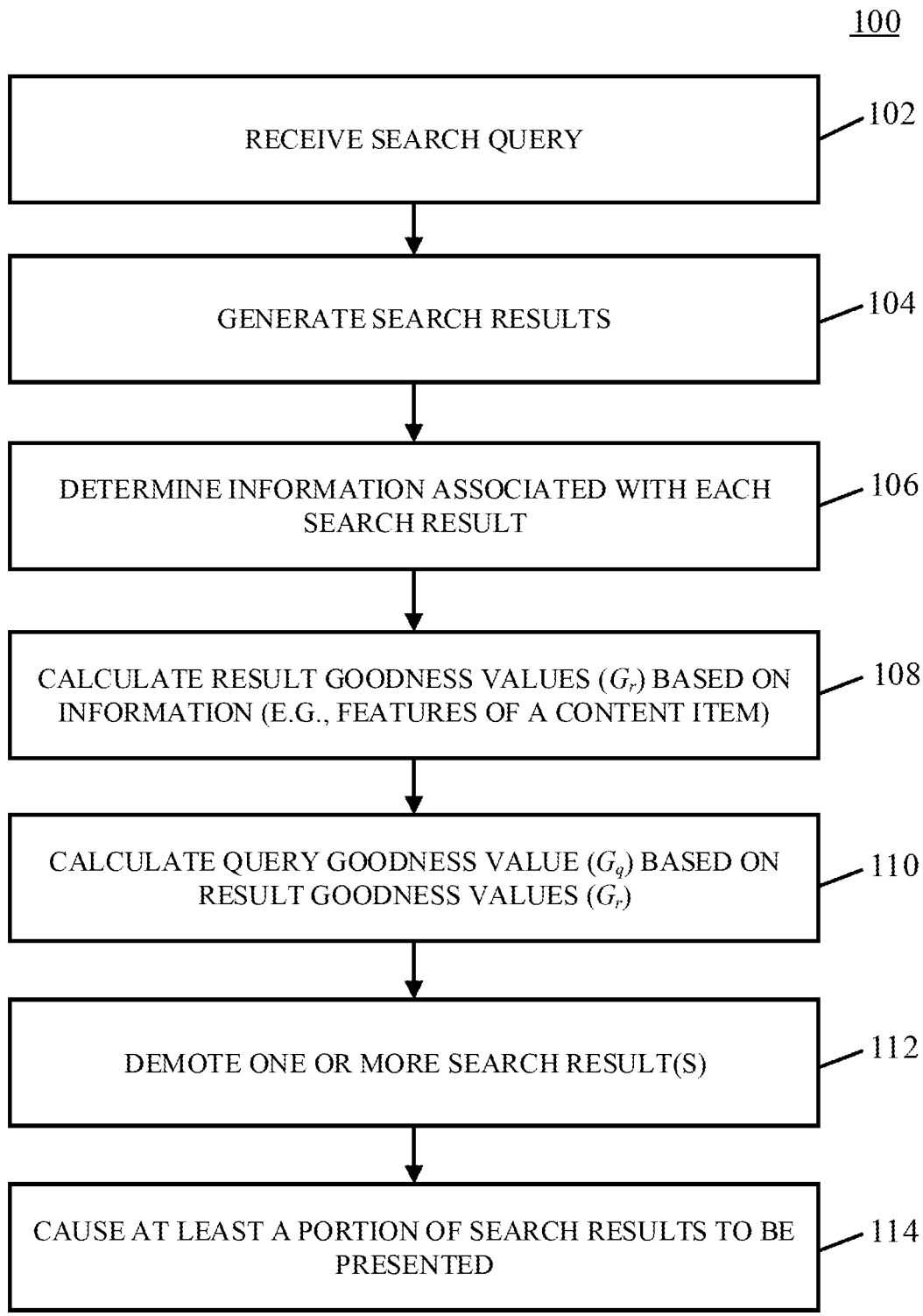
FIG. 1 shows an illustrative example of a process for demoting search results based on search query risk in accordance with some embodiments of the disclosed subject matter.

In accordance with various embodiments, mechanisms (which can include methods, systems, and media) for modifying search results based on search query risk are provided. Advantageously, said mechanisms address the technical problems associated with how to filter abusive content from search results in response to search queries.

In some embodiments, the mechanisms described herein can be used to demote search results. For example, in some embodiments, the mechanisms described herein can receive a search query, generate a plurality of search results in response to the search query, demote a first search result of the plurality of search results, and cause at least a portion of the plurality of search results to be presented based on the demotion, as described below in connection with FIG. 1.

In some embodiments, the mechanism described herein can demote search results based on search query risk. For example, in some embodiments, the mechanism described herein can calculate a set of result values (where result values are also referred to herein as result goodness values) corresponding to respective search results in response to a search query, calculate an overall query value (where query value is also referred to herein as a query goodness value) of the search query based on the set of result goodness values, and demote at least one search result based on the overall query goodness value, as described below in connection with FIGS. 1-5. In a more particular example, in some embodiments, the mechanisms described herein can identify a threshold value (also referred to herein as a threshold goodness value) based on the calculated query goodness value and demote a search result having a result goodness value that is less the threshold goodness value, as described below in connection with FIGS. 1, 5, and 6. That is, a dynamic threshold is provided, the value of which is dependent on the received search query. In another more particular example, in some embodiments, the mechanisms described herein can refer to a function that maps a range of query goodness values to corresponding threshold goodness values, as described below in connection with FIGS. 5 and 6. Accordingly, in some embodiments, the mechanisms described herein can demote or otherwise modify search result positions or rankings based on the variable risk of search queries. In this way, abusive media may be filtered from appearing in the results sent to the user in response to the search query.

In some embodiments, the mechanisms described herein can adjust the function that maps query goodness values to threshold goodness values based on historical search traffic, as described below in connection with FIG. 7. For example, in some embodiments, the mechanisms described herein can adjust the function based on a classifier that classifies historical search results as abusive or not abusive. In a more particular example, in some embodiments, the mechanisms described herein can tune the function based on various weights and/or penalties for misclassification. Accordingly, in some embodiments, search results that are deemed to be abusive search results can be removed and/or hidden (e.g., without demoting search results more than necessary).

In some embodiments, the mechanisms described herein can improve search engine technology. For example, in some embodiments, the mechanisms described herein can determine the context of a search query and use the determined context to perform one or more actions. In a more particular example, in some embodiments, the mechanisms described herein can use effective abuse signals to understand the risk of a search query, and the mechanisms described herein can then vary an aggressiveness and/or granularity of demotions based on the risk.

These and other features for demoting search results based on search query risk are described further in connection with FIGS. 1-9.

Turning to FIG. 1, an illustrative example 100 of a process for demoting search results based on search query risk in accordance with some embodiments of the disclosed subject matter is shown. As illustrated, blocks of process 100 can be executed by one or more servers, as shown and described in connection with FIGS. 8 and 9, and/or any other suitable computing device(s).

At 102, process 100 can receive a search query. For example, in some embodiments, process 100 can receive a search query for one or more video content items from a user device. In some embodiments, a search query can include one or more search terms and/or any other suitable information. For example, the search query for one or more video content items can include the terms "action full movie 2018" or "holiday cartoon."

At 104, process 100 can generate search results in response to receiving the search query. For example, in some embodiments, process 100 can generate search results including one or more content items associated with the search term(s) included in the search query and/or any other suitable information. In a more particular example, process 100 can perform the search by transmitting the received search query to a search engine, which can then execute the search. In some implementations, the search system can use a search application programming interface (API) to search various content sources for search results responsive to the received search query. Search results responsive to the received search query can then be obtained.

It should be noted that, in some embodiments, each search result can correspond to a different content item. In some embodiments, content items can include video content items (e.g., video clips, movies, video playlists, and/or any other suitable video content items), audio content items (e.g., audio clips, music, audiobooks, audio playlists, and/or any other suitable audio content items), images, articles, blogs, web pages, and/or any other suitable content items.

At 106, process 100 can determine information associated with each of the search results. For example, in some embodiments, the information can include one or more features associated with each content item included in the search results. For example, in some embodiments, features can include a quality score associated with a content item, a quality score associated with a user, entity, and/or channel that uploaded the content item, a watch rate score associated with the content item, and/or any other suitable feature information. In some embodiments, each feature can correspond to a feature used by a classifier to classify a content item, a user, a channel, etc. In some embodiments, process 100 can determine any other suitable information associated with each of the search results.

In some embodiments, process 100 can determine information associated with each of the search results in any suitable manner. For example, in some embodiments, process 100 can collect the information from one or more local databases. Additionally or alternatively, in some embodiments, process 100 can collect the information from one or more remote sources, such as a remote server.

At 108, process 100 can calculate a relative goodness of each search result. For example, in some embodiments, process 100 can calculate a respective result goodness value, $G_r$, for each of the search results (e.g., content items). In some embodiments, a result goodness value, $G_r$, can be a numerical value within a particular goodness range. In particular, in some embodiments, the goodness range can include a first boundary (e.g., 1.0) representing relative "goodness" and a second boundary (e.g., 0.0) representing an opposing end of the range, such as relative "badness." In other words, in some embodiments, a result goodness value, $G_r$, can be a value such that $0 \leq G_r \leq 1$. It should be noted that, in some embodiments, the goodness range can have any suitable boundaries, and "good" indicator and/or "bad" indicator can be represented by any suitable value(s) within those boundaries.

For example, in some embodiments, an official video related to a children's cartoon can be an example of a relatively "good" content item, while an abusive re-upload of a movie (e.g., re-upload videos including content that has been previously uploaded on a content provider site and/or associated with another user or entity, impersonate a channel associated with another user or entity, etc.) can be an example of a relatively "bad" content item. Accordingly, the official video related to the children's cartoon can then have a result goodness value closer to the first boundary representing relative "goodness" (e.g., $G_r=1.0$) and the abusive re-upload of the movie can have a result goodness value closer to the second boundary representing relative "badness" (e.g., $G_r=0.0$) in some embodiments. In this way, the result goodness value provides an indication as to whether a result is a relatively good quality result (e.g., an official video) or a relatively bad quality result (e.g., an abusive copy). Put another way, the result goodness value provides an indication as to the quality of the result.

In some embodiments, process 100 can calculate result goodness values in any suitable manner. For example, in some embodiments, process 100 can calculate respective result goodness values for each of the search results (e.g., content items) based on the determined information associated with each of the search results. In a more particular example, in some embodiments, each result goodness value can be calculated based on one or more features associated with a corresponding content item. In some embodiments, process 100 can calculate a result goodness value in the manner shown and discussed in connection with FIG. 2.

Figure 2:
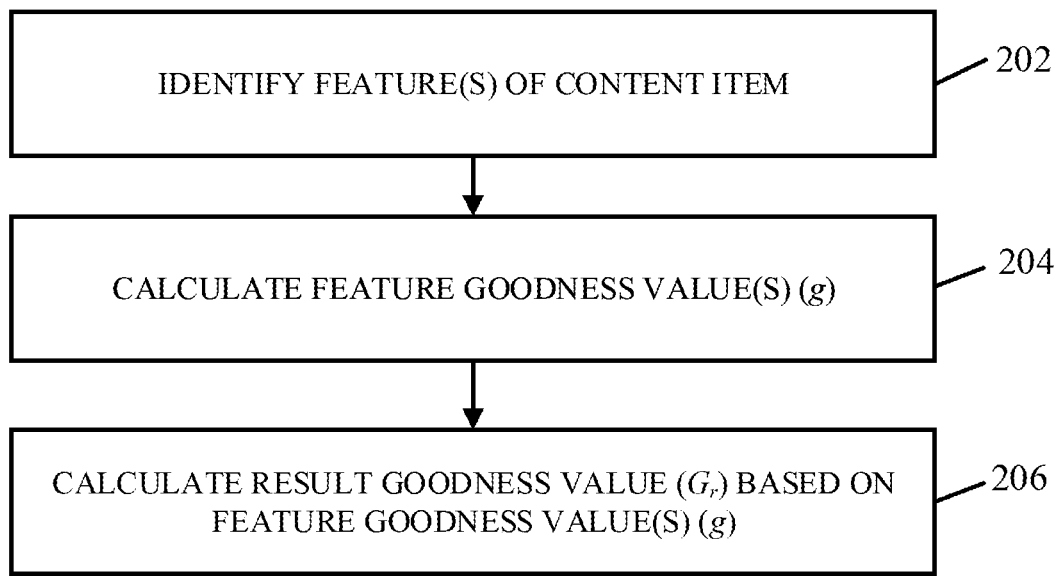
FIG. 2 shows an illustrative example of a process for calculating a result goodness value in accordance with some embodiments of the disclosed subject matter.

Turning to FIG. 2, an illustrative example 200 of a process for calculating a result goodness value in accordance with some embodiments of the disclosed subject matter is shown. As illustrated, blocks of process 200 can be executed by one or more servers, as shown and described in connection with FIGS. 8 and 9, and/or any other suitable computing device(s).

At 202, process 200 can identify one or more features associated with each content item. For example, in some embodiments, the feature(s) can include a quality score associated with the content item, a quality score associated with a user, entity, and/or channel that uploaded the content item, a watch rate score associated with the content item, and/or any other suitable feature information. In a more particular example, a feature can include obtaining a channel score that is associated with a channel or a group of content items, where the content item is associated with the channel. In another more particular example, a feature can include obtaining a watch rate score that can represents the number of views or engagements a content item receives with respect to the number of times that the content item is shown (e.g., a video search result, a thumbnail representation, etc.). In some embodiments, the feature(s) can be identified from the information determined in block 106. In some embodiments, a predetermined value, such as a default value, can be identified for a feature associated with the content item that cannot be determined in block 106.

It should be noted that, in some embodiments, any suitable number of features can be identified or collected. In some embodiments, the type of features used in determining goodness values can be configured by a user receiving search results.

At 204, process 200 can calculate a relative goodness of each identified feature. For example, in some embodiments, process 200 can calculate a respective feature value (where feature value is also referred to herein as a feature goodness value), g, for each feature. In some embodiments, a feature goodness value, g, can be a numerical value within the goodness range. For example, in some embodiments, a feature goodness value g can be a value such that $0 \leq g \leq 1$, where 0 can represent a "bad" or low-quality level of a feature and 1 can represent a "good" or high-quality level of a feature.

In some embodiments, process 200 can calculate a feature goodness value, g, in any suitable manner. For example, in some embodiments, process 200 can map a feature (e.g., feature information determined for a content item) to a feature goodness value using a predetermined function, such as the function shown and described in connection with FIG. 3. It should be noted that, in some embodiments, process 200 can map a feature to a feature goodness value using any suitable function. It is further noted that, in some embodiments, process 200 can use the same function or different functions to map each attribute to a respective feature goodness value. In some embodiments, mapping a plurality of features to one or more functions can normalize features to the goodness range.

Figure 3:
FIG. 3 shows an illustrative example of a function for mapping a feature to a feature goodness value in accordance with some embodiments of the disclosed subject matter.

Turning to FIG. 3, an illustrative example 300 of a function for mapping a feature to a feature goodness value in accordance with some embodiments of the disclosed subject matter is shown. As described above, a watch rate score, w, can be a score that represents the number of views or engagements a content item receives with respect to the number of times that the content item is shown (e.g., a video search result, a thumbnail representation, etc.) and a watch rate goodness value, $g_w$, can provide an indication as to the quality of the watch rate result, where the watch rate goodness value can be an indication as to whether a watch rate result is a relatively good quality watch rate result or a relatively bad quality watch rate result (e.g., an abusive copy). As illustrated, function 300 is a piecewise linear function that maps a watch rate score, w, to a watch rate goodness value, $g_w$, where the watch rate goodness value, $g_w$, is within a goodness range (e.g., $0 \leq g_w \leq 1$). For example, in some embodiments, function 300 can associate a content item having a relatively high watch rate score (e.g., w=0.8) with a relatively high watch rate goodness value (e.g., $g_w$=1.0). As another example, in some embodiments, function 300 can associate a content item having a relatively low watch rate score (e.g., w=0) with a relatively low watch rate goodness value (e.g., $g_w$=0.2).

Turning back to FIG. 2, at 206, process 200 can calculate a result goodness value, $G_r$, for a content item. In some embodiments, a result goodness value for a content item can reflect the overall goodness of a content item based on the goodness of its features. For example, in some embodiments, the result goodness value can be calculated based on the calculated feature goodness values. In a more particular example, in some embodiments, the result goodness value can be calculated as a product of the feature goodness values.

Additionally, in some embodiments, each of the features can be assigned a corresponding weight that is applied to corresponding feature goodness values when calculating the result goodness value. For example, in some embodiments, each weight can be applied as an exponent of a corresponding feature goodness value. In some embodiments, each weight can be a number between 0 and 1. Alternatively, in some embodiments, each weight can be any suitable number.

In some embodiments, process 200 can calculate a result goodness value, $G_r$, for a content item based on the feature goodness values g(feature) and respective weights of each feature k(feature) using Equation 1 as follows:

$$G_r = \prod_{feature} g(feature)^{k(feature)} \qquad \text{(Equation 1)}$$

For example, in some embodiments, assuming a weight of $k_e$=0.4 applied to a quality feature and a weight of $k_w$=0.44 applied to a watch rate feature, and for a content item having a quality goodness value of $g_e$=0.9 and a watch rate goodness value of $g_w$=0.8, process 200 can calculate a goodness result value $G_r$ using Equation 1.1 as follows:

$$G_r = g_e^{k_e} \times g_w^{k_w} = (0.9)^{(0.4)} \times (0.8)^{(0.44)} \approx 0.8691 \qquad \text{(Equation 1.1)}$$

Turning back to FIG. 1, at 110, process 100 can calculate relative goodness of the search query. For example, in some embodiments, process 100 can calculate a query goodness value, $G_q$, for the search query. In some embodiments, a query goodness value can be a value representing overall goodness of a search query based on relative goodness of the search results (e.g., content items) corresponding to the search query. For example, in some embodiments, process 100 can calculate a query goodness value, $G_q$, based on the result goodness values, $G_r$, calculated in block 108. In some embodiments, a query goodness value, $G_q$, can be a numerical value within the goodness range. For example, in some embodiments, a query goodness value, $G_q$, can be a value such that $0 \leq G_q \leq 1$, where 0 can represent a "bad" or low-quality goodness value and 1 can represent a "good" or high-quality goodness value. The query goodness value may indicate a relative quality of the query.

In some embodiments, process 100 can calculate a query goodness value in any suitable manner. For example, in some embodiments, process 100 can calculate the query goodness value, $G_q$, as an average of the calculated result goodness values, $G_r$, using Equation 2 as follows:

$$G_q = \text{avg}_r G_r \qquad \text{(Equation 2)}$$

Alternatively, in some embodiments, process 100 can apply a function, $f$, to each of the calculated goodness values, $G_r$, prior to calculating an average of the result goodness values. For example, in some embodiments, process 100 can calculate a query goodness value, $G_q$, based on result goodness values, $G_r$, using Equation 3 as follows:

$$G_q = \text{avg}_r f(G_r) \qquad \text{(Equation 3)}$$

In some embodiments, the function $f$ can correspond to a kernel that is applied to each of the calculated result goodness values. For example, in some embodiments, the function, $f$, can be the identity function such that $f(G_r)=G_r$, in which case the query goodness value, $G_q$, can simply be calculated as the average of the result goodness values, $G_r$, such as in Equation 2. As another example, in some embodiments, the function, $f$, can be a function for adjusting a result goodness value, such as the function shown and described in connection with FIG. 4. In some embodiments, the function, $f$, can be any suitable function.

Figure 4:
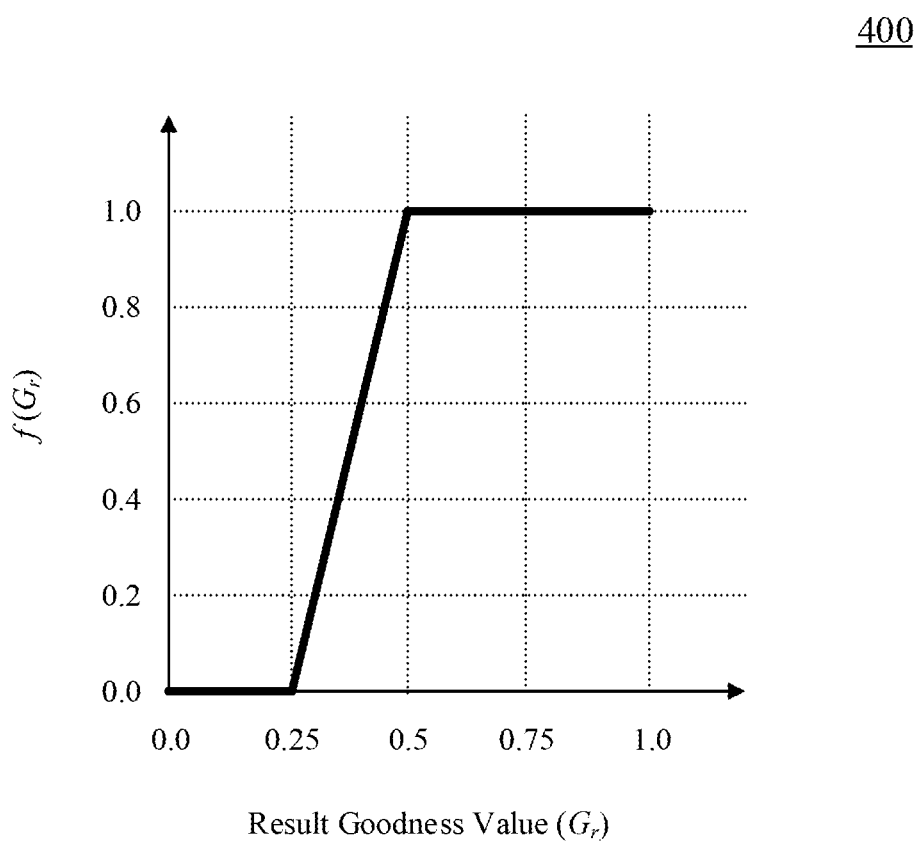
FIG. 4 shows an illustrative example of a function for adjusting a result goodness value in accordance with some embodiments of the disclosed subject matter.

Turning to FIG. 4, an illustrative example 400 of a function for adjusting a result goodness value in accordance with some embodiments of the disclosed subject matter is shown. As illustrated, function 400 is a piecewise linear function defined by Equation 4 as follows:

$$f(G_r) = \begin{cases} 0 & \text{if } 0 \leq G_r \leq 0.25 \\ 4G_r - 1 & \text{if } 0.25 < G_r < 0.5 \\ 1 & \text{if } 0.5 \leq G_r \leq 1 \end{cases} \qquad \text{(Equation 4)}$$

In some embodiments, application of function 400 can adjust a mid-range result goodness value (e.g., $G_r$=0.5) to become a high result goodness value (e.g., $f(G_r)$=1.0). In effect, any search result (e.g., content item) having a result goodness value of $0.5 \leq G_r \leq 1$ prior to adjustment can be identified as a "good" search result by having the high result goodness value after the adjustment in some embodiments.

Additionally, in some embodiments, calculation of a query goodness value, $G_q$, according to Equations 3 and 4 can distinguish between a polarized query, where half of the results are deemed to be very good (e.g., $G_r$=0.9) and half of the results are deemed to be very bad (e.g., $G_r$=0.1), and a mid-range query dominated by mid-range results (e.g., $0.4 \leq G_r \leq 0.6$). For example, in some embodiments, process 100 can calculate a query goodness value of $G_q$=0.5 for a polarized query and a query goodness value of $G_q \approx 0.9$ for a mid-range query using Equations 3 and 4. In contrast, a simple average of result goodness values $G_r$ (e.g., without application of function 400, such as in Equation 2) can yield a query goodness value of $G_q$=0.5 for both the polarized query and the query goodness value in some embodiments.

Turning back to FIG. 1, at 112, process 100 can selectively demote search results. For example, in some embodiments, process 100 can determine whether any content items included in the search results are blacklisted items. Process 100 can then demote any search results associated with content items determined to be blacklisted in some embodiments. In some embodiments, a content item can be blacklisted when a channel and/or user associated with the content item is blacklisted. As another example, process 100 can demote search results based on the calculated result goodness values, the calculated query goodness value, and/or any other suitable information. For example, in some embodiments, process 100 can demote search results in the manner shown and described in connection with FIG. 5. In some embodiments, process 100 can demote search results in any suitable manner.

Figure 5:
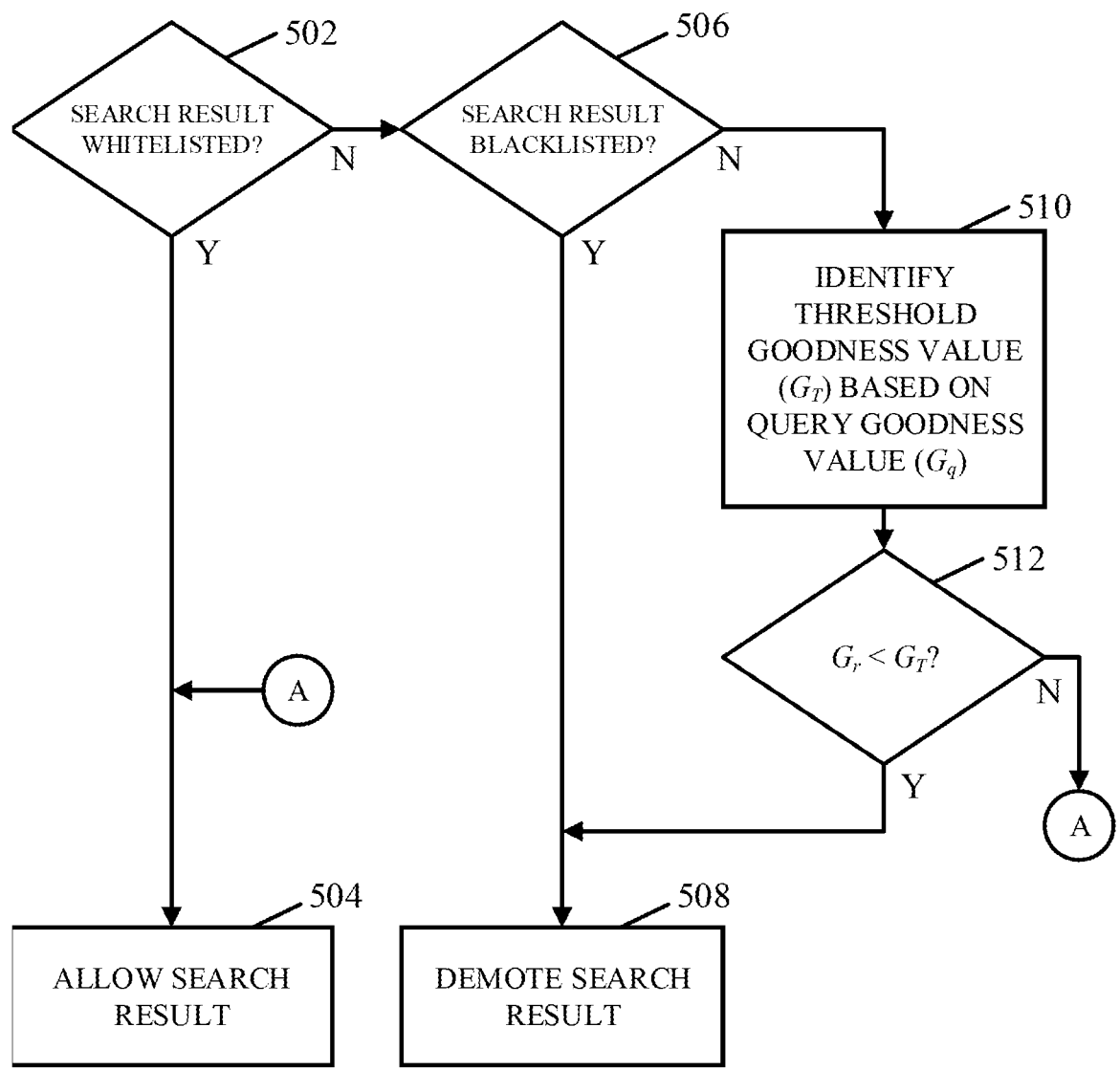
FIG. 5 shows an illustrative example of a process for demoting search results in accordance with some embodiments of the disclosed subject matter.

Turning to FIG. 5, an illustrative example 500 of a process for demoting search results in accordance with some embodiments of the disclosed subject matter is shown. As illustrated, blocks of process 500 can be executed by one or more servers, as shown and described in connection with FIGS. 8 and 9, and/or any other suitable computing device(s). In some embodiments, blocks of process 500 can be performed for each search result in a generated set of search results.

At 502, process 500 can determine whether a search result is included in a whitelist. In some embodiments, process 500 can determine whether a search result is included in a whitelist by determining whether a content item associated with the search result is included in a whitelist. Additionally or alternatively, in some embodiments, process 500 can determine that a search result is included in a whitelist if a channel, playlist, and/or domain (e.g., URL) associated with the search result is included in a whitelist. In some embodiments, process 500 can receive information indicating whether a search result is included in a whitelist. For example, in some embodiments, process 500 can receive the information from a local database and/or a remote source (e.g., a remote server).

At 504, in response to determining that a search result is included in a whitelist, process 500 can allow the search result. In some embodiments, allowing the search result can include allowing the search result to be presented in a list of search results.

However, at 506, in response to determining that a search result is not included in a whitelist, process 500 can determine whether the search result is included in a blacklist. In some embodiments, process 500 can determine whether a search result is included in a blacklist by determining whether a content item associated with the search result is included in a blacklist. Additionally or alternatively, in some embodiments, process 500 can determine that a search result is included in a blacklist if a channel, playlist, and/or domain (e.g., uniform resource locator (URL)) associated with the search result is included in a blacklist. In some embodiments, process 500 can receive information indicating whether a search result is included in a blacklist. For example, in some embodiments, process 500 can receive the information from a local database and/or a remote source (e.g., a remote server).

At 508, in response to determining that a search result is included in a blacklist, process 500 can demote the search result. In some embodiments, demoting a search result can include lowering a rank in which the search result is presented in a list of search results. Additionally or alternatively, in some embodiments, demoting a search result can include preventing monetization of a content item associated with the search result. In other words, playback of a content item associated with a demoted search result can be prevented from accruing ad revenue in some embodiments. In some embodiments, demoting a search result can include preventing the search result from being presented in the list of search results. In some embodiments, demoting a search result can include any other suitable action.

However, at 510, in response to determining that a search result is not included in a blacklist, process 500 can identify a threshold goodness value, $G_T$. In some embodiments, a threshold goodness value can correspond to a minimum allowable result goodness value a search result must have to be presented in a list of search results. In some embodiments, the threshold goodness value, $G_T$, can be any suitable value. For example, in some embodiments, a threshold goodness value, $G_T$, can be a predetermined value, such as 0.5 or any other suitable value. As another example, in some embodiments, process 500 can identify a threshold goodness value, $G_T$, based on the query goodness value, $G_q$, calculated in block 110. In a more particular example, in some embodiments, process 500 can identify the threshold goodness value, $G_T$, based on the function shown and described in connection with FIG. 6. In some embodiments, process 500 can identify a threshold goodness value in any suitable manner.

Figure 6:
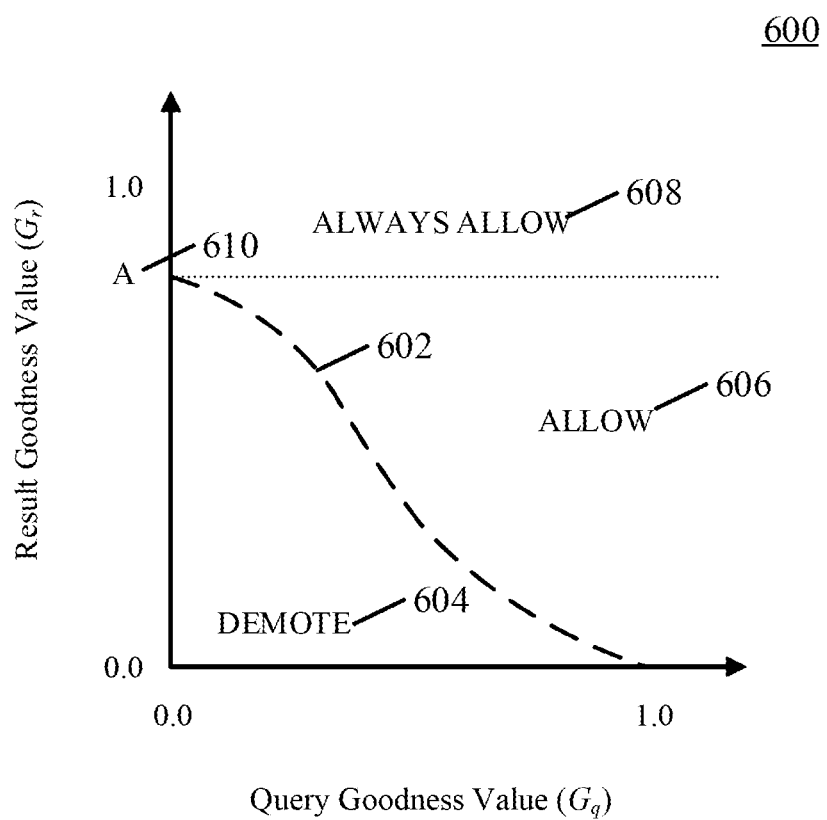
FIG. 6 shows an illustrative example of a function for identifying a threshold goodness value in accordance with some embodiments of the disclosed subject matter.

Turning to FIG. 6, an illustrative example 600 of a function for identifying a threshold goodness value in accordance with some embodiments of the disclosed subject matter is shown. As illustrated, function 600 includes a curve 602 that defines a threshold goodness value, $G_T$, based on a query goodness value, $G_q$, a demote region 604, an allow region 606, and an always allow region 608.

In some embodiments, curve 602 can be a monotonically non-increasing function. In particular, in some embodiments, the threshold goodness value, $G_T$, can decrease as the query goodness value, $G_q$, increases. In other words, riskier search queries (e.g., queries having a query goodness value, $G_q$, closer to 0 or a lower bound) can result in stronger demotions relative to less risky search queries (e.g., queries having a query goodness value, $G_q$, closer to 1 or an upper bound) in some embodiments. As a result, in some embodiments, more search results can be demoted for search queries that are deemed to be riskier search queries, and more search results can be allowed for search queries that are deemed to be less risky search queries.

In some embodiments, curve 602 can map a query goodness value, $G_q$, to a minimum allowable result goodness value, $G_r$ (or a threshold goodness value, $G_T$). In other words, in some embodiments, a search result can be allowed to be presented if it has a result goodness value, $G_r$, that is greater than or equal to a threshold goodness value, $G_T$, corresponding to the query goodness value, $G_q$, of the search query that led to the search result. Furthermore, in some embodiments, a search result can be demoted if it has a result goodness value, $G_r$, that is less than a threshold goodness value, $G_T$, corresponding to the query goodness value, $G_q$, of the search query that led to the search result. Accordingly, in some embodiments, curve 602 can define an upper boundary of demote region 602 and a lower boundary of allow region 606.

In some embodiments, value A 610 can correspond to a maximum value of curve 602. In other words, in some embodiments, a search result having a result goodness value, $G_r$, that is greater than or equal to value A 610 can never be demoted according to function 600. Accordingly, in some embodiments, value A 610 can define a lower boundary of always allow region 608.

Turning back to FIG. 5, at 510, process 500 can identify a threshold goodness value, $G_T$, by mapping the calculated query goodness value, $G_q$, to a corresponding result goodness value, $G_r$, using function 600.

At 512, process 500 can compare a result goodness value, $G_r$, of a search result to the threshold goodness value, $G_T$. For example, in some embodiments, process 500 can determine whether the result goodness value, $G_r$, is less than the threshold goodness value, $G_T$. In some embodiments, the result goodness value used in the comparison can correspond to the result goodness value of the search result calculated in block 108. Alternatively, in some embodiments, the result goodness value used in the comparison can correspond to a predetermined value, such as $G_r$=0.5 or any other suitable value.

At 508, in response to determining that a result goodness value, $G_r$, of a search result is less than the threshold goodness value, $G_T$, process 500 can demote the search result as described above.

However, at 504, in response to determining that a result goodness value, $G_r$, of a search result is greater than or equal to the threshold goodness value, $G_T$, process 500 can allow the search result as described above.

Turning back to FIG. 1, at 114, process 100 can cause at least a portion of the generated search results to be presented based on the demotion performed in block 112. For example, in some embodiments, process 100 can cause at least a portion of the generated search results to be presented such that one or more demoted search results are prevented from being presented. Additionally or alternatively, in some embodiments, process 100 can cause at least a portion of the generated search results to be presented such that one or more demoted search results are presented at a lower rank than originally generated. In some embodiments, process 100 can cause the search results to be presented on the user device that sent the search query.

Figure 7:
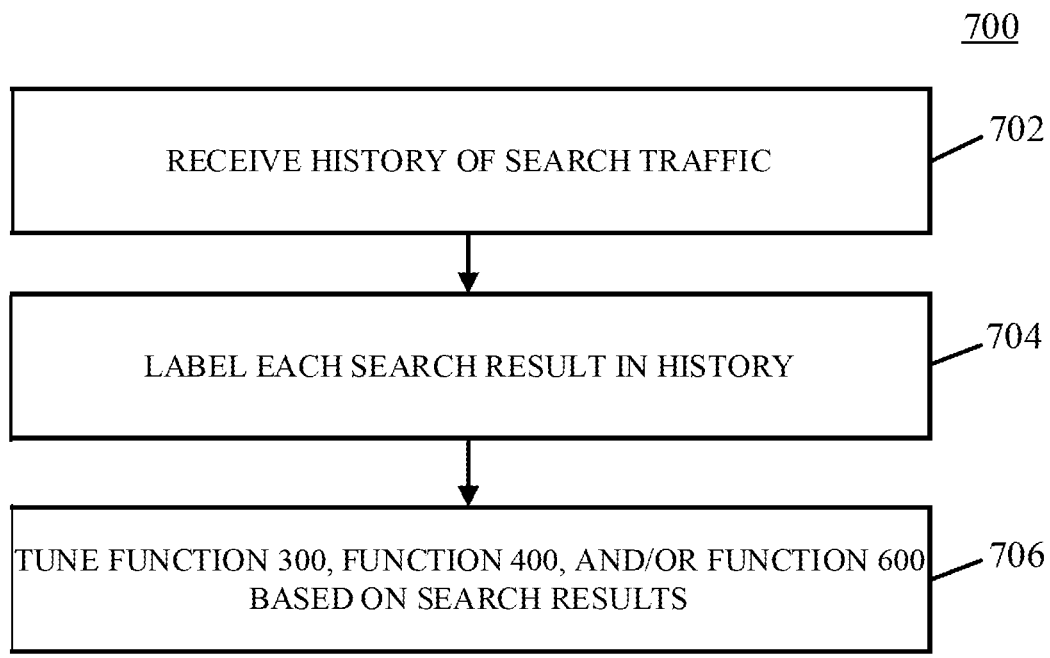
FIG. 7 shows an illustrative example of a process for tuning functions in accordance with some embodiments of the disclosed subject matter.

Turning to FIG. 7, an illustrative example 700 of a process for tuning functions in accordance with some embodiments of the disclosed subject matter is shown. As illustrated, blocks of process 700 can be executed by one or more servers, as shown and described in connection with FIGS. 8 and 9, and/or any other suitable computing device(s).

At 702, process 700 can receive a history of search traffic associated with one or more users. For example, in some embodiments, a history of search traffic can include previous search queries, top-K search results corresponding to those queries, and/or any other suitable information. In some embodiments, process 700 can retrieve the history of search traffic from one or more local databases. Additionally or alternatively, in some embodiments, process 700 can receive the history of search traffic from one or more remote sources, such as a remote server.

At 704, process 700 can label each search result included in the history of search traffic as one of a plurality of labels. For example, in some embodiments, the labels can include a "BAD" label, which corresponds to a result that is deemed to be abusive. As another example, in some embodiments, the labels can include a "GOOD" label, which corresponds to a result that is deemed to be not abusive. As yet another example, in some embodiments, the labels can include an "UNKNOWN" label, which corresponds to a result about which little is known. In some embodiments, the labels can include any other suitable label.

At 706, process 700 can tune one or more functions based at least on the history of search traffic. For example, in some embodiments, process 700 can tune function 300, function 400, and/or function 600 based on the history of search traffic and/or any other suitable information. In some embodiments, process 700 can tune function 300, function 400, and/or function 600 in any suitable manner, such as utilizing support vector machines (SVM), naïve Bayes classifiers, Bayesian networks, decision trees, machine learning models, neural networks, fuzzy logic models, probabilistic classification models, and/or any other suitable technique.

In some embodiments, process 700 can use the labeled search results to tune function 300, function 400, and/or function 600. For example, in some embodiments, the labeled search results can be used as a training dataset of a model and/or a classifier. In a more particular example, in some embodiments, search results labeled as "BAD" can be included in a set of negative examples of the training dataset. Additionally or alternatively, in some embodiments, search results labeled as "GOOD" or "UNKNOWN" can be included in a set of positive examples of the training dataset. In some embodiments, the training dataset can include any other suitable examples and/or information.

Additionally, in some embodiments, each search result included in the training dataset can be associated with a weight based on a label associated with the search result. For example, in some embodiments, a "BAD" search result can be associated with a mid-range weight (e.g., 4.0). As another example, in some embodiments, a "GOOD" search result can be associated with a relatively high weight (e.g., 16.0). In effect, wrongly demoting a "GOOD" search result can lead to a relatively large penalty in some embodiments. As yet another example, in some embodiments, an "UNKNOWN" search result can be associated with a relatively low weight (e.g., 0.1+p(x|q)). In some embodiments, p(x|q) can correspond to a fraction of the search query watch time attributed to the search result. Accordingly, in some embodiments, wrongly demoting an "UNKNOWN" search result can lead to a relatively small penalty (e.g., between 0.1 and 1.1).

In some embodiments, process 700 can use a logistic loss function to perform the tuning, such as Equation 5 as follows:

$$l(p) = \frac{\log \frac{p}{1-p}}{\text{slope}} \quad \text{(Equation 5)}$$

In some embodiments, p as referenced in Equation 5 can correspond to a probability of a search result belonging to a positive class. Additionally, in some embodiments, slope as referenced in Equation 5 can correspond to slope=2 or any other suitable value.

Figure 8:
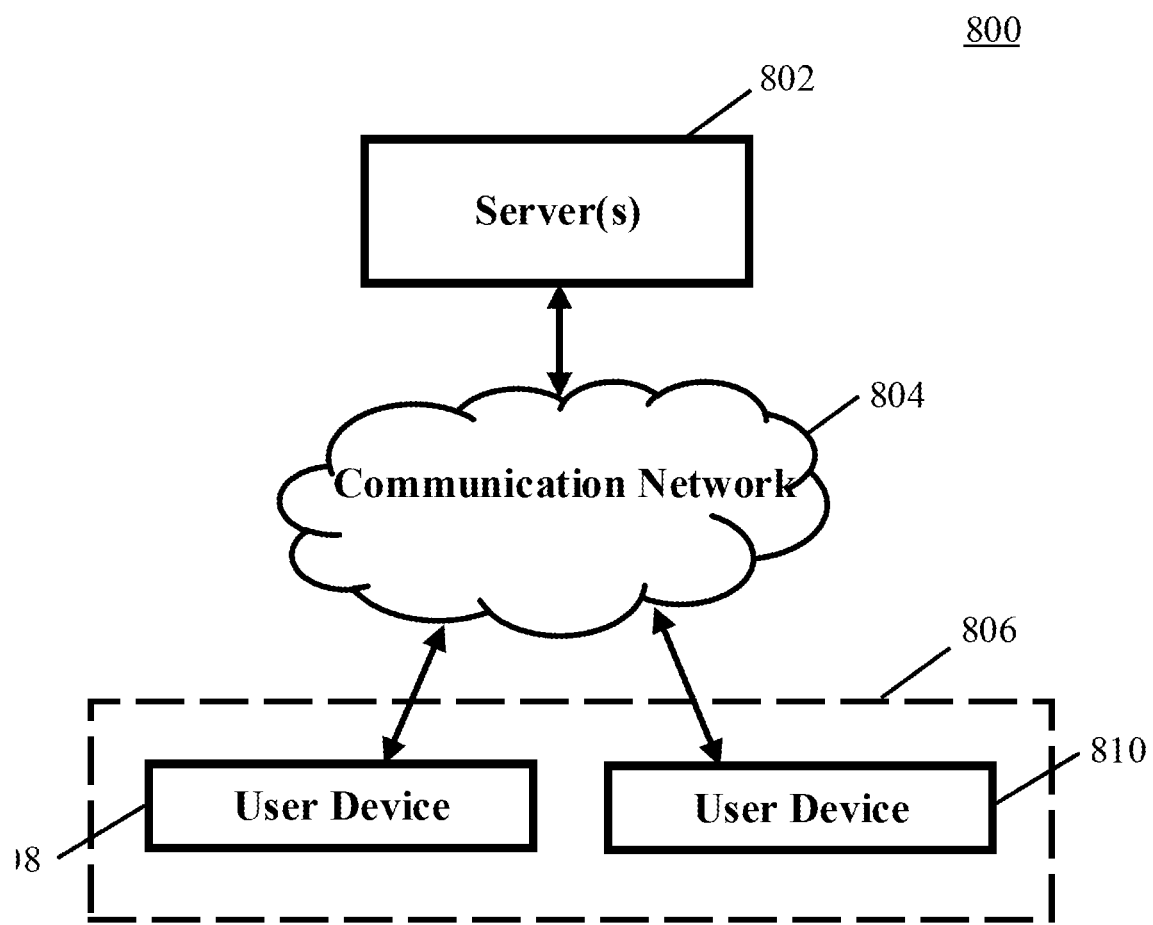
FIG. 8 shows a schematic diagram of an illustrative system suitable for demoting search results based on search query risk in accordance with some embodiments of the disclosed subject matter.
Figure 9:
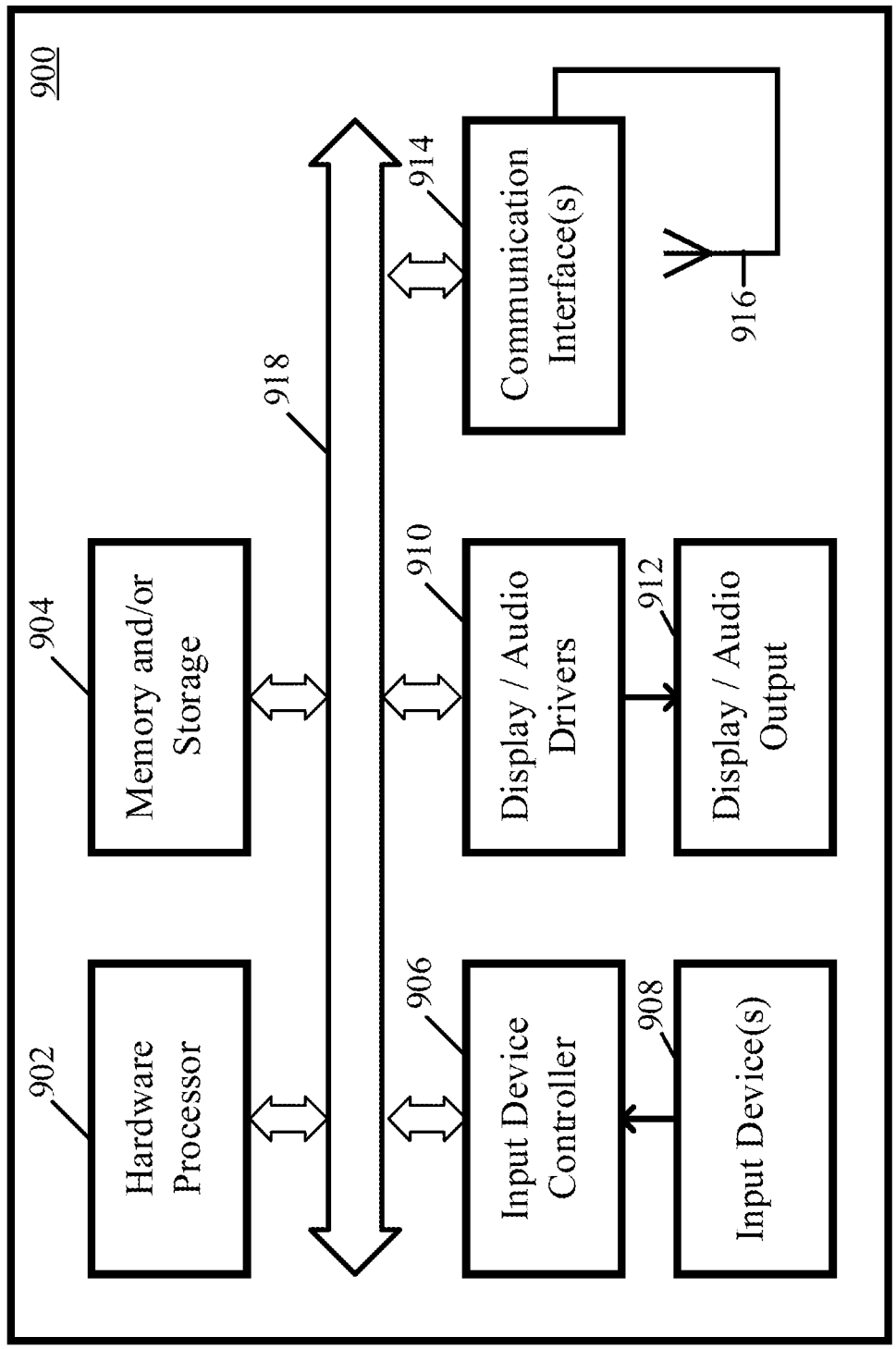
FIG. 9 shows a detailed example of hardware that can be used in a server and/or a user device of FIG. 8 in accordance with some embodiments of the disclosed subject matter.

Turning to FIG. 8, an example 800 of hardware for modifying search results based on search query risk that can be used in accordance with some embodiments of the disclosed subject matter is shown. As illustrated, hardware 800 can include a server(s) 802, a communication network 804, and/or one or more user devices 806, such as user device 808 and user device 810.

Server(s) 802 can be any suitable server for storing information, data, programs, and/or any other suitable type of content for modifying search results based on search query risk. In some embodiments, server(s) 802 can receive a search query, generate search results, determine information associated with the search results, calculate result goodness values, calculate query goodness values, demote search results, cause at least a portion of the search results to be presented, receive a history of search traffic, label search results in the history of search traffic, and/or tune one or more functions, as described above in connection with FIGS. 1-7.

Communication network 804 can be any suitable combination of one or more wired and/or wireless networks in some embodiments. For example, communication network 804 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. In some embodiments, communication network 804 can be linked via one or more communications links to server(s) 802 and/or user device(s) 806. The communications links can be any communications links suitable for communicating data among user device(s) 806 and server(s) 802, such as network links, dial-up links, wireless links, hard-wired links, any other suitable communications links, or any suitable combination of such links.

User device(s) 806 can include any one or more user devices. For example, in some embodiments, user device(s) 806 can include a television, speakers, a mobile phone, a tablet computer, a desktop computer, a laptop computer, a vehicle entertainment system, a wearable computer, and/or any other suitable type of user device. In some embodiments, user device(s) 806 can perform any suitable function(s), such as sending a search query and/or presenting search results, as described above in connection with FIG. 1.

Although server(s) 602 is illustrated as one device, the functions performed by server(s) 602 can be performed using any suitable number of devices in some embodiments. For example, in some embodiments, multiple devices can be used to implement the functions performed by server(s) 602.

Although two user devices 808 and 810 are shown in FIG. 8 to avoid over-complicating the figure, any suitable number of user devices, and/or any suitable types of user devices, can be used in some embodiments.

Server(s) 802 and user device(s) 806 can be implemented using any suitable hardware in some embodiments. For example, in some embodiments, devices 802 and 806 can be implemented using any suitable general-purpose computer or special-purpose computer. For example, a mobile phone may be implemented using a special-purpose computer. Any such general-purpose computer or special-purpose computer can include any suitable hardware. For example, as illustrated in example hardware 900 of FIG. 9, such hardware can include hardware processor 902, memory and/or storage 904, an input device controller 906, an input device 908, display/audio drivers 910, display and audio output circuitry 912, communication interface(s) 914, an antenna 916, and a bus 918.

Hardware processor 902 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 902 can be controlled by a server program stored in memory and/or storage 904. For example, in some embodiments, the server program can cause hardware processor 902 to receive a search query, generate search results, determine information associated with the search results, calculate result goodness values, calculate query goodness values, demote search results, cause at least a portion of the search results to be presented, receive a history of search traffic, label search results in the history of search traffic, tune one or more functions, and/or perform any other suitable functions.

Memory and/or storage 904 can be any suitable memory and/or storage for storing programs, data, and/or any other suitable information in some embodiments. For example, memory and/or storage 904 can include random access memory, read-only memory, flash memory, hard disk storage, optical media, and/or any other suitable memory.

Input device controller 906 can be any suitable circuitry for controlling and receiving input from one or more input devices 908 in some embodiments. For example, input device controller 906 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 910 can be any suitable circuitry for controlling and driving output to one or more display/audio output devices 912 in some embodiments. For example, display/audio drivers 910 can be circuitry for driving a touchscreen, a flat-panel display, a cathode ray tube display, a projector, a speaker or speakers, and/or any other suitable display and/or presentation devices.

Communication interface(s) 914 can be any suitable circuitry for interfacing with one or more communication networks (e.g., communication network 804). For example, interface(s) 914 can include network interface card circuitry, wireless communication circuitry, and/or any other suitable type of communication network circuitry.

Antenna 916 can be any suitable one or more antennas for wirelessly communicating with a communication network (e.g., communication network 804) in some embodiments. In some embodiments, antenna 716 can be omitted.

Bus 918 can be any suitable mechanism for communicating between two or more components 902, 904, 906, 910, and 914 in some embodiments.

Any other suitable components can be included in hardware 700 in accordance with some embodiments.

In some embodiments, at least some of the above described blocks of the processes of FIGS. 1, 2, 5, and 7 can be executed or performed in any order or sequence not limited to the order and sequence shown in and described in connection with the figures. Also, some of the above blocks of FIGS. 1, 2, 5, and 7 can be executed or performed substantially simultaneously where appropriate or in parallel to reduce latency and processing times. Additionally or alternatively, some of the above described blocks of the processes of FIGS. 1, 2, 5, and 7 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for modifying search results based on search query risk are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for demoting search results, the method comprising:
   receiving, by a hardware processor, a search query for a video content item;
   generating, by the hardware processor, a plurality of search results in response to the search query, each search result corresponding to a respective video content item;
   calculating, by the hardware processor, a set of result values, wherein each result value of the set of result values is associated with a respective search result of the plurality of search results, and wherein the each result value is based at least on a watch rate score representing a number of views the respective video content item receives with respect to a number of times the respective video content item is presented;
   calculating, by the hardware processor, a query value associated with the search query based on the set of result values;
   in response to determining whether the respective search result is automatically allowed to be presented in a list of search results as being included in a whitelist and in response to determining whether the respective search result is automatically demoted in the list of search results as being included in a blacklist, identifying, by the hardware processor, a threshold value based on the query value, wherein the threshold value is represented by a threshold goodness function that maps query goodness values to a minimum allowable result goodness value, wherein the threshold goodness function decreases as the query goodness values increase, and wherein the threshold goodness function is tuned according to a machine learning model based on a training dataset of labeled search results;
   determining, by the hardware processor, whether the each result value of the set of result values is less than the threshold value determined by the threshold goodness function;
   in response to determining that a first result value of the set of result values is less than the threshold value determined by the threshold goodness function, demoting, by the hardware processor, a first search result of the plurality of search results, wherein the first result value is associated with the first search result; and
   filtering, by the hardware processor, abusive media content from being presented in a list of at least a portion of the plurality of search results, wherein the first search result is excluded from the list of at least the portion of the plurality of search results based on the demotion.

2. The method of claim 1, further comprising:
   collecting feature information for the respective search result of the plurality of search results, the feature information including the watch rate score;
   calculating a plurality of feature values for the respective search result of the plurality of search results based on the feature information; and
   calculating each result value of the set of result values based on the plurality of feature values of the respective search result.

3. The method of claim 1, wherein calculating the query value comprises calculating an average of the set of result values.

4. The method of claim 3, further comprising adjusting at least one result value of the set of result values prior to calculating the average.

5. The method of claim 1, further comprising adjusting the threshold goodness function based on historical search traffic.

6. A system for demoting search results, the system comprising:
   a hardware processor that is configured to:
   receive a search query for a video content item;
   generate a plurality of search results in response to the search query, each search result corresponding to a respective video content item;
   calculate a set of result values, wherein each result value of the set of result values is associated with a respective search result of the plurality of search results, and wherein the each result value is based at least on a watch rate score representing a number of views the respective video content item receives with respect to a number of times the respective video content item is presented;
   calculate a query value associated with the search query based on the set of result values;
   in response to determining whether the respective search result is automatically allowed to be presented in a list of search results as being included in a whitelist and in response to determining whether the respective search result is automatically demoted in the list of search results as being included in a blacklist, identify a threshold value based on the query value, wherein the threshold value is represented by a threshold goodness function that maps query goodness values to a minimum allowable result goodness value, wherein the threshold goodness function decreases as the query goodness values increase, and wherein the threshold goodness function is tuned according a machine learning model based on a training dataset of labeled search results;

determine whether the each result value of the set of result values is less than the threshold value determined by the threshold goodness function;

in response to determining that a first result value of the set of result values is less than the threshold value determined by the threshold goodness function, demote a first search result of the plurality of search results, wherein the first result value is associated with the first search result; and filter abusive media content from being presented in a list of at least a portion of the plurality of search results, wherein the first search result is excluded from the list of at least the portion of the plurality of search results based on the demotion.

7. The system of claim 6, wherein the hardware processor is further configured to:

collect feature information for the respective search result of the plurality of search results, the feature information including the watch rate score;

calculate a plurality of feature values for the respective search result of the plurality of search results based on the feature information; and calculate each result value of the set of result values based on the plurality of feature values of the respective search result.

8. The system of claim 6, wherein the hardware processor is further configured to calculate an average of the set of result values.

9. The system of claim 8, wherein the hardware processor is further configured to adjust at least one result value of the set of result values prior to calculating the average.

10. The system of claim 6, wherein the hardware processor is further configured to adjust the threshold goodness function based on historical search traffic.

11. A non-transitory computer-readable medium containing computer-executable instructions that, when executed by a processor, cause the processor to perform a method for demoting search results, the method comprising:

receiving a search query for a video content item;

generating a plurality of search results in response to the search query, each search result corresponding to a respective video content item;

calculating a set of result values, wherein each result value of the set of result values is associated with a respective search result of the plurality of search results, and wherein the each result value is based at least on a watch rate score representing a number of views the respective video content item receives with respect to a number of times the respective video content item is presented;

calculating a query value associated with the search query based on the set of result values;

in response to determining whether the respective search result is automatically allowed to be presented in a list of search results as being included in a whitelist and in response to determining whether the respective search result is automatically demoted in the list of search results as being included in a blacklist, identifying a threshold value based on the query value, wherein the threshold value is represented by a threshold goodness function that maps query goodness values to a minimum allowable result goodness value, wherein the threshold goodness function decreases as the query goodness values increase, and wherein the threshold goodness function is tuned according to a machine learning model based on a training dataset of labeled search results;

determining whether the each result value of the set of result values is less than the threshold value determined by the threshold goodness function;

in response to determining that a first result value of the set of result values is less than the threshold value determined by-the threshold goodness function, demoting a first search result of the plurality of search results, wherein the first result value is associated with the first search result; and filtering abusive media content from being presented in a list of at least a portion of the plurality of search results, wherein the first search result is excluded from the list of at least the portion of the plurality of search results based on the demotion.

12. The non-transitory computer-readable medium of claim 11, the method further comprising:

collecting feature information for the respective search result of the plurality of search results, the feature information including the watch rate score;

calculating a plurality of feature values for the respective search result of the plurality of search results based on the feature information; and calculating each result value of the set of result values based on the plurality of feature values of the respective search result.

13. The non-transitory computer-readable medium of claim 11, wherein calculating the query value comprises calculating an average of the set of result values.

14. The non-transitory computer-readable medium of claim 13, the method further comprising adjusting at least one result value of the set of result values prior to calculating the average.

15. The non-transitory computer-readable medium of claim 11, the further comprising adjusting the threshold goodness function based on historical search traffic.

* * * * *